United States Patent [19]
Pope

[11] 3,864,409
[45] Feb. 4, 1975

[54] METHOD FOR VINYL HALIDES
[76] Inventor: Bill J. Pope, c/o Department of Chemical Engineering, Brigham Young University, Provo, Utah 84601
[22] Filed: Nov. 30, 1970
[21] Appl. No.: 93,742

[52] U.S. Cl............... 260/656 R, 260/656 AC
[51] Int. Cl............................. C07c 21/02
[58] Field of Search ............... 260/656 R, 656 AC

[56] References Cited
UNITED STATES PATENTS
2,328,430  8/1943  Dornte.......................... 260/656
2,391,465  12/1945  Lazier et al................... 260/656
2,779,805  1/1957  Millard, Jr..................... 260/656

Primary Examiner—Leon Zitver
Assistant Examiner—P. A. Siegel
Attorney, Agent, or Firm—Stowell & Stowell

[57] ABSTRACT

Vinyl halides are prepared by direct reaction of free radicals made by thermal or catalytic cracking of hydrocarbons with halogen or hydrogen halide.

6 Claims, 1 Drawing Figure

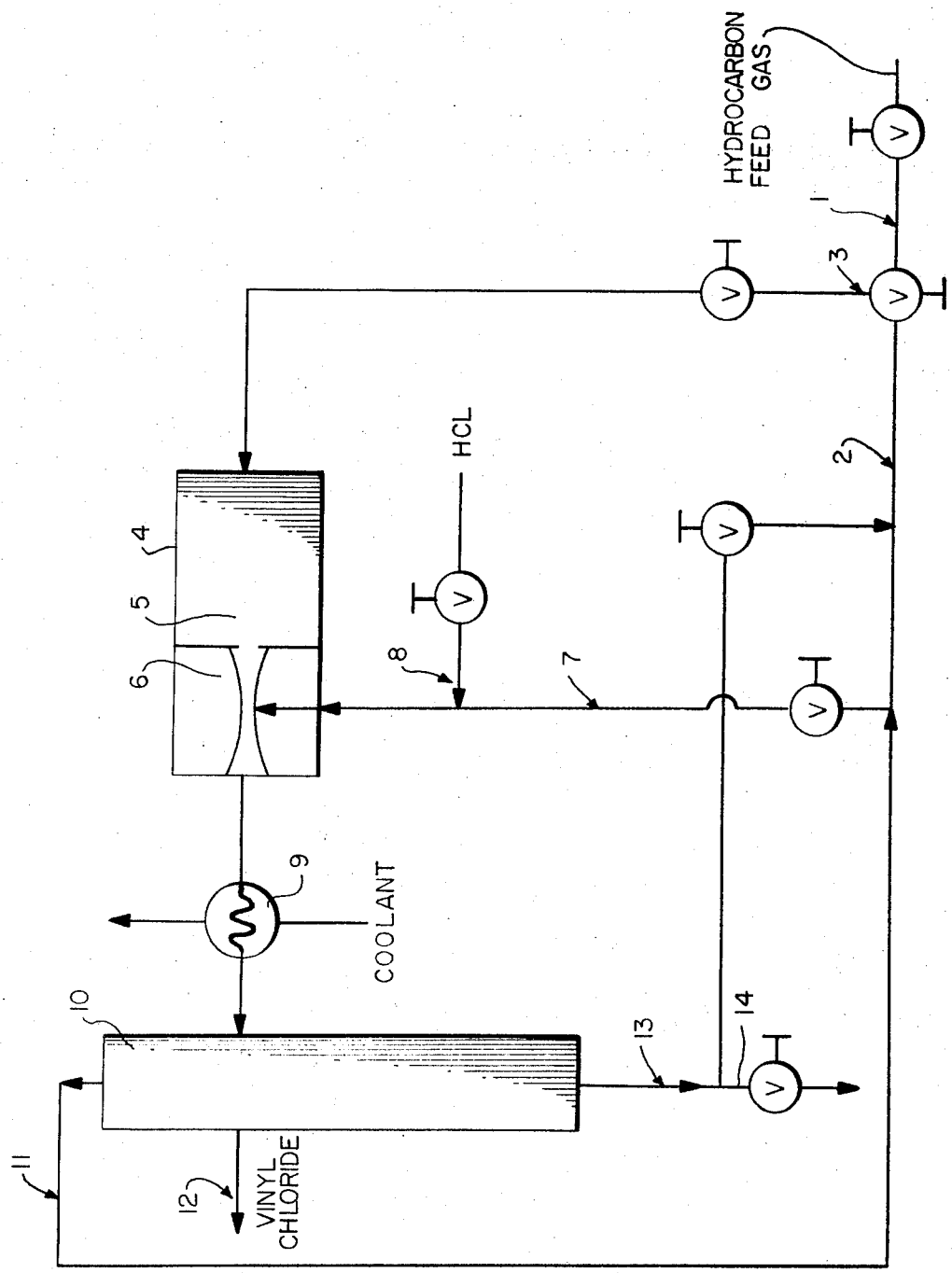

METHOD FOR VINYL HALIDES

This invention relates to a method for the preparation of vinyl halides.

Vinyl halides are most generally prepared by adding hydrogen halide, i.e., hydrogen fluoride, hydrogen chloride, hydrogen bromide, hydrogen iodide, to acetylene. Vinyl chloride, the most widely commercially utilized vinyl halide, is also prepared by the oxychlorination of ethylene or by the thermal cracking of 1,2-dichloroethane made by adding chlorine to ethylene. Acetylene and ethylene, the basic organic starting materials for the conventional preparative methods of the prior art, are generally produced as products or by-products in the cracking of hydrocarbons. Each step in the prior art procedures for preparing vinyl halides, particularly cracking, is effected in a separate reactor, usually with separation and/or purification between process steps.

I have now discovered that vinyl halides, i.e., vinyl fluoride, vinyl chloride, vinyl bromide and vinyl iodide, can be prepared by the direct reaction of the corresponding halogen or hydrogen halide, with hydrocarbon free radicals produced by the thermal or catalytic cracking of hydrocarbons. According to the process of the invention, hydrocarbons are thermally or catalytically cracked and the free radical-containing reaction mixture quenched with elemental halogen or hydrogen halide to form the vinyl halide as a major product.

It is, therefore, a principal object of the present invention to provide an improved method for the preparation of vinyl halides. It is another object of the invention to provide a method whereby vinyl halides are prepared without the necessity for the intermediate preparation and isolation of ethylene or acetylene. It is a further object of the present invention to provide a method which can be combined with existing hydrocarbon cracking procedures to prepare vinyl halides by direct reaction of halogen or hydrogen halide with the hydrocarbon precursor.

The above and other objects of my invention will become apparent to those skilled in the art from the following description and accompanying drawing which is a flowsheet illustrating a cyclic method for the continuous preparation of vinyl chloride according to the invention.

More specifically, the present invention is a method for the preparation of vinyl halides which comprises thermally or catalytically cracking a hydrocarbon and quenching the cracked mixture with halogen or hydrogen halide.

In practicing the method of the present invention, a hydrocarbon or hydrocarbon mixture is thermally or catalytically cracked to form free radicals under conditions of temperature and pressure selected to maximize the formation of acetylene precursors. The gaseous reaction mixture produced in the cracking operation is then quickly quenched by addition of cooler quench gases containing halogen or hydrogen halide. The halogen source in the quench gases combines with hydrocarbon free radicals present to form the corresponding vinyl halide. The halide product is separated by conventional methods and residual gases and/or by-products, with or without further separation, are recycled to the cracking step and quench streams as appropriate.

Hydrocarbons suitable as starting materials in practicing the process of the present invention are natural gas, methane, ethane, propane, butane, and naphtha, with natural gas and methane the preferred reactants. The hydrocarbon reactant is cracked at temperatures ranging from 500°C. upwards and generally at about 1550°C., the optimum temperature for maximizing the concentration of desired acetylene precursor free radicals. The cracking may be thermal or catalytic using conventional silica-alumina, clay and zeolite cracking catalysts. When using a plasma arc reactor, which operates best above 3000°C., the optimum cracking temperature would be advantageously exceeded.

Cracking can be effected at atmospheric, subatmospheric or super-atmospheric pressures ranging up to 100 atmospheres. While cracking of hydrocarbons is thermodynamically favored at low pressures, reactor size is inversely proportional to pressure and economic considerations favor use of moderate pressure. The range 0 to 20 psig represents a practical operating condition.

By rapidly quenching the hot cracked reaction mixture in the presence of halogen or hydrogen halide, a large fraction of the acetylene precursors in the reaction mixture is converted to the corresponding vinyl halide. The reaction mixture should be quenched to a temperature below 400°C.; optimum yields are obtained at about 320°C.

As noted, a principal advantage of the present method is that overall conversion of hydrocarbon feed stock to vinyl halide is accomplished in one reactor avoiding the separation and purification of intermediate products. The separation of vinyl halide product from light hydrocarbon by-products in the present method is more facile than the separation of acetylene or ethylene from light hydrocarbons involved in prior art procedures.

The halogenation reaction according to the method of the present invention may be fluorination, chlorination, bromination, or iodination, with the corresponding halogen or hydrogen halide as the inorganic reactant. The reaction to be illustrated in most detail is chlorination with hydrogen chloride, primarily because of the large market for vinyl chloride and the general avilability of hydrogen chloride. The particular procedures illustrated are applicable to the making of the other vinyl halides, and hydrocarbons or hydrocarbon mixtures and halogens of halides other than those specifically illustrated may be utilized.

EXAMPLE I

A methane feed having the composition:

| Constituent | Mol % |
|---|---|
| $CH_4$ | 97.00 |
| $C_2H_6$ | 1.82 |
| $C_2H_x$ | 0.37 |
| $CO_2$ | 0.36 |
| $N_2$ | 0.40 | was passed to the cracking zone of a reactor enclosed in a 2¾ inch diameter stainless tube 12 inches long. The cracking zone was an electrically heated porous carbon element 1½ cm. in diameter and 5 cm. in length within an alumina tube. The temperature within the cracking zone was 1280°C. as measured with a tungsten-tungsten rhenium thermocouple. The feed rate was 13 ml/sec., measured at 650 mg Hg and at 26°C., and the residence time of feed gas within the hot cracking zone was 0.63 seconds. The quench stream was natural gas at the rate of 13.9 ml/sec. and dry HCl gas at the rate of 4 ml/sec., both also measured at 650 mm Hg and at 26°C., and the temperature in the quench zone was maintained below 300°C. The yield of vinyl chloride was 60% based on methane fed.

EXAMPLE II

A methane feed having the same composition as in the previous example was passed to the cracking zone of a larger reactor enclosed in a flanged steel cylinder 8 inches in diameter and 7 inches in length, more fully described in my co-pending application Ser. No. 785,156, filed Dec. 19, 1968. The cracking zone was a porous carbon element one-fourth inch in diameter and 3 inches in length, maintained at 1626°C. The feed gas was fed at the rate of 0.125 CFM and the residence time in the cracking zone was 0.0024 second. The quench stream was of the same composition as in the previous example and was in 4:1 ratio with the feed, maintaining a temperature in the quench zone below 250°C. The yield of vinyl chloride based on fresh feed was 30%.

EXAMPLE III

The continuous operation of a cyclic process for the preparation of vinyl halide according to the invention is illustrated in the flowsheet of the drawing. Natural gas feed from valved line 1 is mixed with a recycle stream from line 2 in mixing valve 3 in a proportion of 1 mole feed to 0–0.45 moles of recycle gas. The mixture is passed to reactor 4 comprising a cracking zone 5 at or near atmospheric pressure and maintained at a temperature between 1300°–1600°C., and a quenching zone 6. The residence time of the natural gas feed mixture within the cracking zone 5 can vary but is usually maintained at about 0.01 second. The cracked gas mixture is then passed to the quenching zone 6 wherein a mixture of quench gas, mostly recycle hydrogen and methane, from line 7 in admixture with hydrogen chloride gas from line 8 is added. The quantity of quench gases added is adjusted, generally in 6:1 ratio with the feed, so that the temperature in the quenching zone is quickly lowered to 200°–400°C. Slow quenching results in the formation of large amounts of carbon and the quench rate should be in the order of $10^5$°C./second. The still warm gas mixture from the quenching zone can be passed in heat exchange relationship (not illustrated) with the feed gas being supplied to the reactor and further cooled with coolant in heat exchanger 9 and the cooled effluent passed to separation zone 10. Uncondensed gases are removed overhead via line 11 for recycle to the cracking step or for return to the quenching zone; vinyl chloride product is removed through intermediate line 12, higher boiling bottoms are withdrawn via line 13 for recycle to the hydrocarbon feed mixture. Provision is made for bleeding by-products, which may be recovered, via line 14.

A preferred reactor for use in practicing the method of the present invention is described in my co-pending application Ser. No. 785,156, filed Dec. 19, 1968. However, the present process may be operated in conjunction with existing apparatus for the cracking of hydrocarbons to acetylene such as the Wulff regenerative furnace, the Huels electric arc furnace, various other furnaces utilizing combustion or resistance heating, and equipment used in the plasma arc process.

Other variations in the method of my invention will suggest themselves to those skilled in the art and my invention is as claimed.

I claim:

1. A method for the preparation of vinyl halides which comprises thermally or catalytically cracking methane, ethane, propane, butane, naphtha, or natural gas at a temperature above 500°C. and for a time sufficient to produce acetylene precursor free radicals and quenching the cracked product with a halogen or hydrogen halide to a temperature below 400°C.

2. A method according to claim 1 wherein the hydrocarbon is cracked at about 1550°C.

3. A method according to claim 1 wherein the cracked mixture is quenched with halogen or hydrogen halide in admixture with uncracked hydrocarbon.

4. A method according to claim 1 wherein the cracked mixture is quenched with halogen or hydrogen halide in admixture with a quench gas containing hydrogen.

5. A method according to claim 1 wherein the hydrogen halide is hydrogen chloride.

6. A cyclic method for the preparation of vinyl halides which comprises thermally or catalytically cracking methane, ethane, propane, butane, naphtha, or natural gas at a temperature above 500°C. and for a time sufficient to produce acetylene precursor free radicals, quenching the cracked product with halogen or hydrogen halide in admixture with a quench gas to a temperature below 400°C., further cooking the quenched gas mixture and separating the resultant vinyl halide in a separation zone, returning the overhead from the separation zone to the quenching zone and returning a portion of the bottoms from the separation zone to the cracking zone.

* * * * *